United States Patent [19]
Halldin

[11] Patent Number: 5,474,597
[45] Date of Patent: Dec. 12, 1995

[54] METHOD AND DEVICE FOR GAS CLEANING OR GAS COOLING

[75] Inventor: Claes Halldin, Gemla, Sweden

[73] Assignee: ABB Flakt AB, Stockholm, Sweden

[21] Appl. No.: 284,677

[22] PCT Filed: Mar. 4, 1993

[86] PCT No.: PCT/SE93/00188

§ 371 Date: Aug. 30, 1994

§ 102(e) Date: Aug. 30, 1994

[87] PCT Pub. No.: WO93/18842

PCT Pub. Date: Sep. 30, 1993

[30] Foreign Application Priority Data

Mar. 18, 1992 [SE] Sweden ................................ 9200835
Mar. 18, 1992 [SE] Sweden ................................ 9200836

[51] Int. Cl.⁶ .................................................. B01D 47/06
[52] U.S. Cl. ................................. 95/199; 95/200; 95/202; 95/225; 55/220; 55/257.1; 55/259; 261/118
[58] Field of Search ............................... 55/220, 223, 228, 55/257.1, 259; 95/187, 195, 199, 200, 202, 223–225; 261/118

[56] References Cited

U.S. PATENT DOCUMENTS

| | | | |
|---|---|---|---|
| 2,387,473 | 10/1945 | Spitzka | 261/118 X |
| 2,523,441 | 9/1950 | McKamy. | |
| 2,589,956 | 3/1952 | Panteleieff et al. | |
| 2,593,548 | 4/1952 | Edwards | 261/118 X |
| 3,353,335 | 11/1967 | Caballero | 95/224 |
| 3,488,924 | 1/1970 | Reeve | 261/118 X |
| 3,532,595 | 10/1970 | Arnesjo et al. | 162/47 |
| 3,616,597 | 11/1971 | Stewart | 95/224 X |
| 3,691,731 | 9/1972 | Garcia | 55/223 |
| 4,164,399 | 8/1979 | Kannapell | 55/223 |
| 4,269,812 | 5/1981 | Edwards et al. | 95/224 X |
| 4,401,626 | 8/1983 | Lewis | 261/118 X |
| 4,452,614 | 6/1984 | Kovac | 55/220 |
| 4,583,999 | 4/1986 | Lindahl et al. | 55/228 X |
| 5,173,093 | 12/1992 | Johnson et al. | 95/224 |
| 5,308,385 | 5/1994 | Winn | 95/195 |
| 5,376,312 | 12/1994 | Morton et al. | 261/118 |

FOREIGN PATENT DOCUMENTS

| | | | |
|---|---|---|---|
| 0614688 | 12/1926 | France | 261/118 |
| 2600534 | 7/1977 | Germany. | |
| 3122565 | 12/1982 | Germany | 95/187 |
| 3341318 | 5/1985 | Germany. | |
| 60-129118 | 7/1985 | Japan | 95/187 |
| 103474 | 1/1942 | Sweden. | |
| 0902795 | 2/1982 | U.S.S.R. | 55/220 |
| 0376418 | 7/1932 | United Kingdom | 261/118 |
| 1357783 | 6/1974 | United Kingdom | 261/118 |

*Primary Examiner*—Robert Spitzer
*Attorney, Agent, or Firm*—Burns, Doane, Swecker & Mathis

[57] ABSTRACT

In a method for cleaning polluted gas and/or cooling of hot gas, and a device for carrying out the method, the gas is contacted with finely divided liquid. The finely divided liquid is supplied in the form of essentially umbrella-shaped shells or essentially linear curtains, in a regular arrangement, distributed in two or more planes substantially perpendicular to the main flow direction of the gas. The finely divided liquid is supplied such that the gas is alternatively concentrated and spread by the impulse action exerted by the liquid on the gas in directions perpendicular to the main flow direction of the gas. The orthogonal distance between adjacent planes in which finely divided liquid is supplied, is so adjusted that no substantial equalization of the gas flow takes place between the planes. The supply of liquid in adjacent planes is so arranged that it, in a plane located downstream in the flow direction of the gas, takes place where the flowing gas has been concentrated by the impulse action of liquid supplied in the plane located immediately upstream.

23 Claims, 4 Drawing Sheets

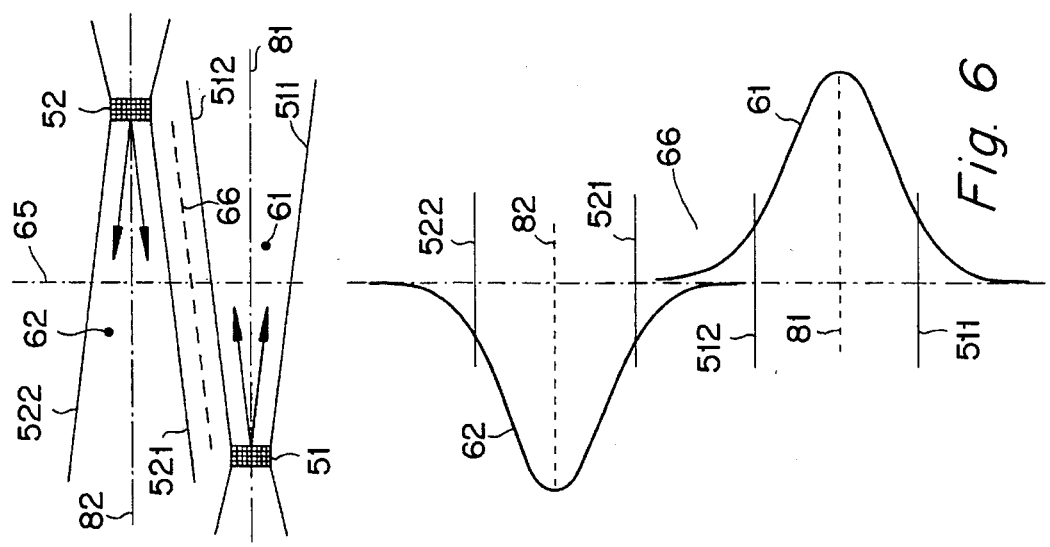
Fig. 6
Fig. 5
Fig. 4
Fig. 3a
Fig. 3b
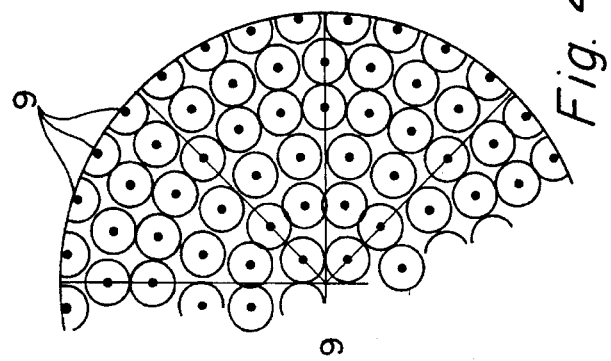
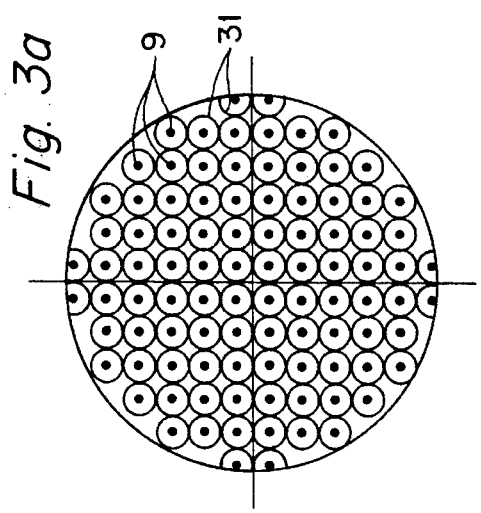
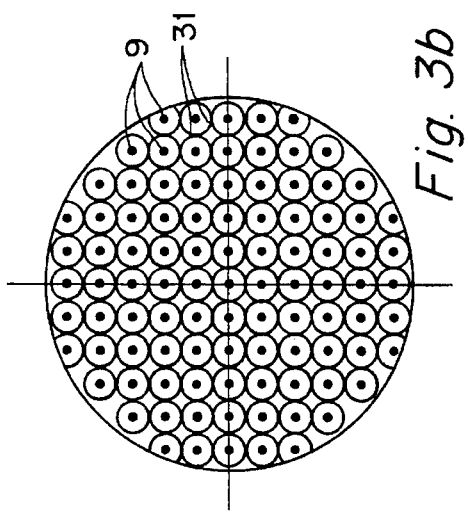

METHOD AND DEVICE FOR GAS CLEANING OR GAS COOLING

TECHNICAL FIELD

The present invention relates to a method for cleaning polluted gas and or cooling of hot gas, wherein the gas is contacted with finely divided liquid for the separation of particles or absorption of gaseous pollutants or cooling of the gas. The finely divided liquid is supplied in the form of essentially umbrella-shaped shells or essentially linear curtains, in a regular arrangement, distributed in two or more planes substantially perpendicular to the main flow direction of the gas. The present invention also relates to a device for carrying out the method. The device comprises an inlet for polluted and/or hot gas, an outlet for cleaned and/or cooled gas, and a contact section located therebetween. The contact section accommodates a plurality of supply means provided for injecting finely divided liquid and arranged in two or more planes substantially perpendicular to the main flow direction of the gas.

The solution to the technical problem contemplated in the present application can be applied to gas cleaning devices, so-called scrubbers, and gas cooling devices, such as conditioning towers and heat recovery apparatuses, of most conceivable sizes. The highest demands and thus also the most important applications, however exist in large industries, large power plants or large incineration plants. In the following description, it is therefore assumed that the devices are on an industrial scale where the gas washing towers may have a diameter of about 1–20 m, and a height of about 1–40 m. For the sake of convenience the term "washing" will be used in the following as meaning either cleaning or cooling or both cleaning and cooling.

The method is applicable only to open gas washing towers. So-called packed scrubbers or packed columns cannot be used as contact section in the method of the invention. However, in a cascade-connected arrangement, it is of course possible to use a combination of the suggested washing method and, for instance, packed columns.

The method is especially well suited in contexts where gas cleaning is to be carried out in combination with the recovery of heat from a polluted hot gas, since the good contact between the liquid and the gas also promotes heat transfer.

TECHNICAL BACKGROUND

Cleaning of polluted gas with a view to removing particulate or gaseous substances is an important and common process in today's industrialized society. A vast variety of techniques have been developed, and today there are often several methods to choose between when a gas cleaning plant is to be designed, even when very specific pollutants are to be removed.

Particulate pollutants are often removed by means of dynamic separators, such as cyclones, electrostatic precipitators or barrier filters, bag filters or cassette filters.

Gaseous pollutants are generally removed by the roundabout technique of using some additive for convening the gases into particulate substances, either by binding them to the surface of particles supplied, dry or wet, or by reacting them with substances supplied, also in gaseous or liquid form, so as to obtain a particulate product. The reaction product is thereafter separated in a particle separator.

Cooling gas with a view to adapting its temperature or recovering heat therefrom is also nowadays an important and common process. Heat transfer generally takes place either by means of heat exchangers of recuperative or regenerative type or by direct contact between the hot and the cold medium. Since this invention concerns heat transfer by direct contact between a gas and a liquid, other techniques will not be discussed.

One method which is advantageous in many respects consists in conducting a gas through a rain of finely divided liquid or past surfaces overflowed by a liquid. These methods make it possible to cool a hot gas as well as to capture particles in the liquid and to dissolve gaseous components of a polluted gas in the liquid. The liquid may then also contain substances convening the dissolved gaseous components into solid form in order to make it easier to separate them from the liquid.

The liquid is normally recycled in the washing device, but a portion thereof is removed, generally continuously, in order to use its heat in other applications or to be subsequently treated for separating pollutants, either in gaseous form or in solid form, optionally for recovering the substances, and the thus cooled or in other way treated liquid can be recycled to the gas washing plant to be used again.

These gas washing plants can roughly be divided into open towers where the gas only encounters a finely divided liquid, and packed scrubbers or packed columns where the gas flows through a tower filled with e.g. saddle-shaped or coil-shaped, small parts, on to which liquid is sprayed so as to produce a liquid film which flows downwards over essentially the entire total surface.

Since packed scrubbers do not fall within the field of application of the present invention, they will not be discussed here.

Examples of open towers, e.g. for separating sulphur dioxide and cooling a gas in order to recover heat, are given in e.g. U.S. Pat. No. 3,532,595, where both vertical towers and scrubbers with horizontal gas flow are disclosed and liquid is supplied at several levels or positions. U.S. Pat. No. 4,164,399 describes a tower of less complex design, where liquid is supplied only at one level but is distributed after being captured at several levels. U.S. Pat. No. 2,523,441 shows a combination of an open tower with a packed section.

The above-mentioned techniques substantially require that the liquid used in the gas washer, during the major part of its movement in the tower, falls or flows downwards by gravity. It is however also known to design scrubbers which generate more or less horizontal liquid curtains through which the gas is flowed. One example of this is found in the highly complex design disclosed in SE-103,474, where the descending movement of the gas is assumed largely to take place along the vertical walls. Two other examples are given in U.S. Pat. No. 2,589,956 and U.S. Pat. No. 3,691,731.

An intermediate design is disclosed in U.S. Pat. No. 4,583,999, where the washing liquid is supplied horizontally but, probably after some deceleration, descends as a rain of finely divided droplets.

In a gas washing tower of the type closest the invention in the known "State of the art", e.g. DE-A1 33 41 318 or U.S. Pat. No. 3,532,595, liquid is generally supplied at 4–6 levels. Each level has several nozzles distributing small droplets within an area generally in the form of a conical shell, hollow-cone type, or within a complete cone, full-cone type. The vertex angle of this cone is 90°–120°.

Each level is provided with nozzles arranged with a spacing of 0.5–1 m, in a regular lattice. The distance between the levels is 1–2 m. At least some levels are located far above the bottom of the tower. The purpose of this is that these levels should produce droplets which in the form of a well-distributed rain descend through the tower throughout a considerable part of its height.

The efficiency of the gas washer is largely dependent on the relative movement between the droplets and the gas. It is therefore generally preferred that the gas flows upwards in a direction contrary to the descending droplets, i.e. countercurrently, but for various reasons there also exist gas washers in which the gas descends in the same direction as the descending droplets, i.e. concurrently.

If it is desirable to increase the gas washing efficiency when using this method, it is necessary either to increase the height of the tower or to increase the flow of washing liquid. Whichever option is chosen, the consequence is increased pump work for a given volume of gas flow.

DESCRIPTION OF THE INVENTION

TECHNICAL PROBLEM

Open gas washing towers suffer from the major disadvantage of requiring much space. This also entails considerable building costs.

Another drawback, resulting from the former, is that the towers must normally be very high. This means that the liquid which is to descend through the tower in the form of a rain of fine droplets must first be pumped up to a considerable height. Such pump work has a considerable impact on the costs of operation.

OBJECT OF THE INVENTION

Gas cleaning and gas cooling in wet-type washers, so-called scrubbers, has for many decades been a well-established technique in process industries, power plants and incineration plants. This technique is well tried and must be considered both efficient and reliable. The most obvious drawbacks, which will have been appreciated from the above, reside in that the equipment requires much space, thus becoming expensive, and much energy, primarily because of the considerable pump work.

It therefore is a principal object of the present invention to provide an improved method requiring far less bulky gas washing equipment while maintaining the reliability and efficiency of known methods.

Another object of the present invention is to provide a method and a device requiring less energy for gas cleaning and gas cooling.

SUMMARY OF THE INVENTION

The present invention relates to a method for cleaning polluted gas and/or cooling of hot gas, wherein the gas is contacted with finely divided liquid for the separation of particles or absorption of gaseous pollutants or cooling of the gas. The finely divided liquid is supplied in the form of essentially umbrella-shaped shells or essentially linear curtains, in a regular arrangement, distributed in two or more planes substantially perpendicular to the main flow direction of the gas.

According to the invention, the solution to the contemplated technical problem is achieved by supplying the finely divided liquid such that the gas is alternately concentrated and spread by the impulse action exerted by the liquid on the gas in directions perpendicular to the main flow direction of the gas.

The orthogonal distance between adjacent planes in which finely divided liquid is supplied, is so adjusted that no substantial equalisation of the gas flow takes place between the planes, The supply of liquid in adjacent planes is so arranged that it, in a plane located downstream in the flow direction of the gas, takes place where the flowing gas has been concentrated by the impulse action of liquid supplied in the plane located immediately upstream.

GENERAL DESCRIPTION OF THE INVENTION

In the following description, the term "tower" is synonymous with "washing tower", and the term "liquid" is synonymous with "washing liquid". The term "gas" means both incoming gas, polluted gas or hot gas, and gas being cleaned or cooled in the contact section.

In the method of the invention, the gas is supplied with finely divided liquid from regularly arranged supply means. These means are referred to below as nozzles, and may be of various designs. The most general type is a means supplying, around a substantially cylindrical body, finely divided liquid within a hollow cone, like an umbrella-shaped shell, or an elongate means supplying, along a substantially straight line, finely divided liquid as a curtain generated by an imaginary motion of this line.

The nozzles are so arranged that the finely divided liquid, when being supplied, imparts to the gas a motion sideways, i.e. transversely of the main flow direction of the gas, thereby producing a concentration effect. The nozzles generally supply liquid in a direction, having its main component, perpendicular to the direction of the main flow of the gas through the scrubber. The nozzles may be oriented to spray in one and the same direction in a full plane and in the opposite direction in the next plane, but preferably all the planes are provided with circular-spraying umbrella-forming nozzles or with linear nozzles distributing liquid in at least two opposite directions.

By means of nozzles arranged in a lattice, supplying liquid in directions substantially perpendicular to the main flow direction of the gas, a displacement and a concentration of the gas are brought about such that substantially the entire flow passes through the plane in areas that are not adjacent any nozzle. With equal spacing between the nozzles, this area is located around the centre of gravity of the surface defined by the connecting lines between adjacent nozzles.

According to the invention, in a plane downstream of the first, as seen in the direction of the flowing gas, the nozzles should be disposed opposite these centres of gravity. Furthermore, the planes should be located so close that there will not be sufficient space or time for the gas flow to be equalised to any major extent before the gas comes into contact with the finely divided liquid from the nozzles in the next downstream plane.

Downstream of this second plane, there are similarly arranged a third plane, a fourth plane and so on, as required. A zigzag-like motion through the contact section is thus imparted to the gas.

The distance between the planes should be adapted to the nozzle design, such that the liquid supplied in one plane does not interact to a substantial extent with a contrary flow of liquid from adjacent nozzles in the adjacent planes. This distance should however be so small that completely droplet-free areas are avoided as far as possible. The distance shall be less than 1 m, preferably less than 0,6 m.

As a measure of the interaction may be indicated that part of the droplets from a nozzle in a certain plane which encounters a higher concentration or droplet flow density from the adjacent nozzle in an adjacent plane. In the points of space where this takes place, the droplet flow density, seen as a distribution in the space transversely of the droplet flow, should have dropped at least to 10% of the maximum value at the distance in question from the nozzle.

Since the efficiency depends on the intensity of the contact between the gas and the liquid, the distance between the planes and the droplet distribution of the nozzles should however preferably be so adjusted that a minor interaction takes place. A small amount of the droplets from one nozzle should thus come into contact with a small amount from said adjacent nozzle. According to the invention, at least 0.01%, preferably at least 0.1% of the maximum droplet flow density, should exist where a hypothetical boundary line between the flows is drawn where the two flows have equal density.

If only two planes with nozzles are used, the cone angle of the "umbrella" can be arbitrarily selected for the first plane, while, for the second plane, it is so adjusted that the umbrellas from the two planes are nominally tangent to each other. If several planes of nozzles are required, it is advantageous to supply the liquid substantially in the plane, i.e. with a 180° cone angle. This gives a simple symmetry. Also in the case of only two planes, this angle could be the most advantageous.

The distribution of nozzles in one plane is advantageously in the form of a regular lattice. If all the planes are to be equipped equally, the square structure is the most advantageous. Using a lattice of equilateral triangles would however not entail any considerable drawbacks, even if the planes must then be different pairwise. Also rhombic lattices and, as mentioned, completely rectilinear parallel nozzles may be readily used.

To achieve the advantages of the invention, the number of lattice points in each plane should be relatively large, at least 16, preferably at least 25. In the case of linear nozzles, at least 5 nozzles should be used in each plane.

BRIEF DESCRIPTION OF THE DRAWINGS

The invention will now be described in more detail with reference to the accompanying drawings, in which

FIG. 3a shows a suggested distribution of nozzles in planes 81 and 83 of a washing tower of circular cross-section having a plan according to FIG. 2.

FIG. 3b shows a suggested distribution of nozzles in planes 82 and 84 of the washing tower of FIG. 3a;

FIG. 4 shows an alternative distribution of nozzles in a washing tower of circular cross-section.

FIG. 5 shows in more detail the distribution of liquid droplets around some nozzles.

FIG. 6 shows the droplet flow density distribution as a function of a space coordinate for the nozzles in FIG. 5.

FIG. 7b shows a suggested distribution of nozzles in planes 82 and 84 in the washing tower of FIG. 7a;

DETAILED DESCRIPTION

Figure 1:
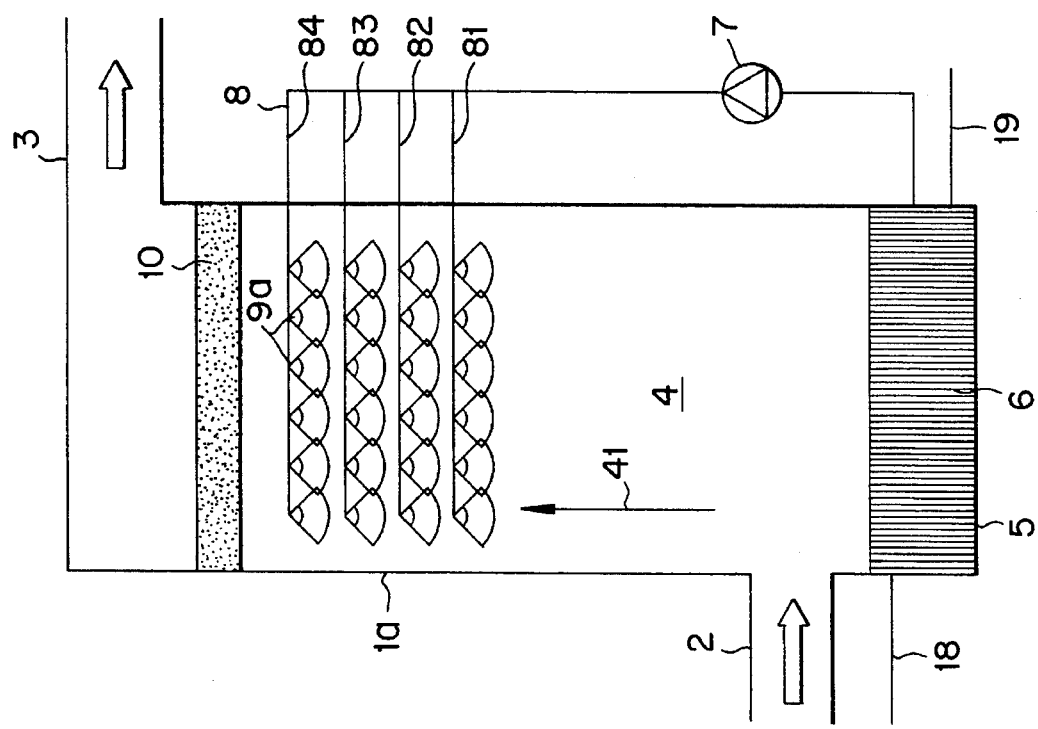
FIG. 1 is a vertical section of a washing tower of conventional design.

FIG. 1 schematically shows a known washing tower 1a having an inlet 2 for polluted gas, an outlet 3 for cleaned gas, and an intermediate contact section 4. In the bottom part 5 of the washing tower 1a, washing liquid 6 is collected. The washing liquid 6 is pumped by a pump 7 up to distributing pipes 8, with nozzles 9a arranged in the upper part of the contact section 4. The difference in level between the planes 81–84 with nozzles 9a is approximately 2 m. The nozzles 9a, which are shown highly schematically, are of the hollow-cone type, i.e. they spray finely divided washing liquid within a conical shell having a 120° vertex angle. The washing liquid then descends as a rain of fine droplets through the contact section and is collected in the bottom part 5. Over the distributing pipes 8 and the nozzles 9a, there is provided a droplet separator 10. Fresh washing liquid can be supplied through a conduit 18, and spent polluted washing liquid can be removed through another conduit 19.

Figure 2:
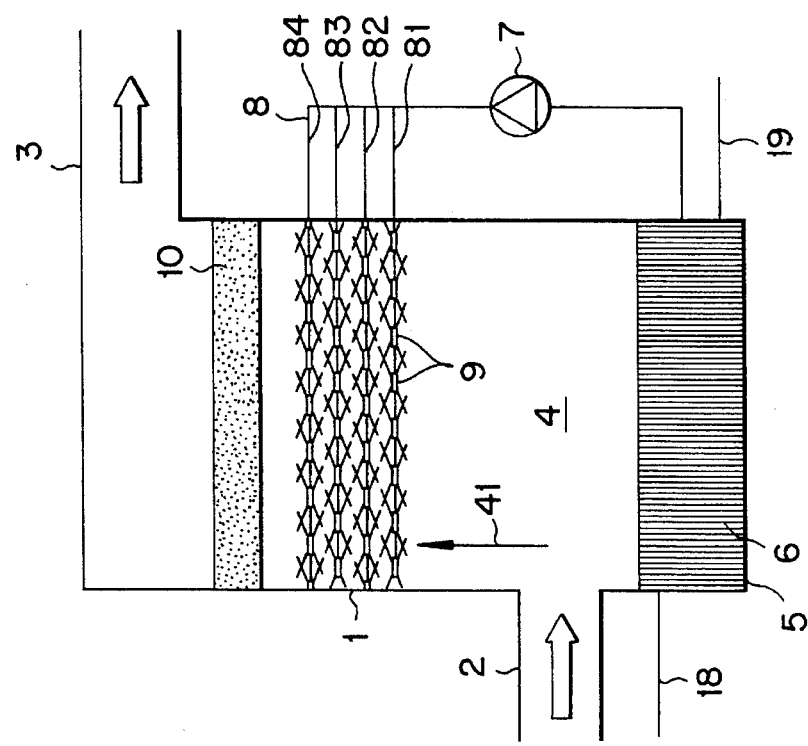
FIG. 2 is a vertical section of a washing tower according to the present invention.

FIG. 2 shows, also schematically, a tower 1 designed in accordance with the present invention. This tower 1 differs from that shown in FIG. 1 by its essentially reduced height. Further, the contact section 4 is provided with nozzles 9 spreading finely divided liquid substantially horizontally, i.e. as a hollow-cone nozzle having a vertex angle of 180°. In this case, the difference in level between the planes with nozzles is only 20–60 cm. For greater clarity, the drawing is in this respect not to scale, the actual difference in height between the tower 1a in FIG. 1 and the tower 1 in FIG. 2 being greater than as is schematically shown. The pans of FIG. 2 corresponding to FIG. 1 bear the same reference numerals.

FIGS. 3a and 3b show in a practical application the distribution of nozzles 9 over the cross-section of a tower having circular cross-section. The tower has a diameter of about 12 m and interiorly accommodates about 100 nozzles, in each plane, in a square lattice pattern with a pitch of about 1 m. The distribution is indicated by the circles 31, illustrating how the finely divided liquid 6 is sprayed at each lattice point. FIG. 3a thus shows the distribution of the nozzles 9 in the planes 81 and 83 in FIG. 2, and FIG. 3b shows the corresponding distribution of the nozzles in the planes 82 and 84.

To avoid that a small part of the gas may be passing almost rectilinearly through the tower along the walls, the nozzle distribution of FIG. 4 may be considered. Here, the entire tower circumference is equipped with nozzles 9 oriented inwards and spraying liquid substantially in a semicircle, and the distribution of nozzles 9 within the tower has been adjusted to this. As appears, the pattern does not become completely regular, and the distribution of the nozzles in the next plane must be adjusted in a manner slightly deviating from the theoretically desired one.

FIG. 5 shows in more detail how the nozzles 9 in two adjacent planes are arranged in relation to each other and within which area the finely divided liquid is supplied, through an imaginary vertical section diagonally through the patterns in FIG. 3. To facilitate the understanding of the invention, the scale has been distorted by increasing the distances in the vertical direction in relation to the distances in the horizontal plane.

From a nozzle 51 in the plane 81 finely divided liquid comes in a flow 61. From a nozzle 52 in the plane 82 a contrary flow 62 comes. The flows 61 and 62 are not limited by the indicated flow lines 511, 512 and 521, 522, which mark the boundaries within which the main parts of the flows are located. The flows interfere partially with each other, and the boundary where they are substantially equally large is indicated by a line 66. Here, the droplet flow density is however substantially less than in the central portion.

FIG. 6 gives an example of the density distribution of the droplet flow in FIG. 5 in a section taken along the line 65. By "droplet flow density" is here meant mass flow per unit area. From this Figure appears the successive decrease of the flow with increasing distance from the respective plane. As mentioned, the line 66 indicates the boundary of the areas where the respective droplet flow is the predominant one.

According to the invention, the distance between the planes 81 and 82 should be adapted to the distribution of finely divided liquid such that the droplet flow densities 61 and 62 at the boundary line 66 both fall below 10% of the maximum value existing close to the respective plane 81, 82. However, for optimal utilisation of the advantages of the invention, it is however assumed that the distance between the planes 81, 82 does not become too large. Therefore, the droplet flow densities 61, 62 should exceed 0.01% of the maximum value at the boundary line 66, preferably exceed 0.1% of the maximum value.

Figure 7A:
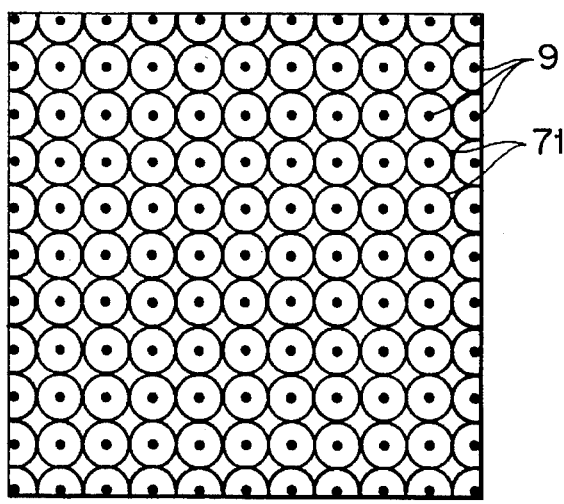
FIG. 7a shows a suggested distribution of nozzles in planes 81 and 83 of a washing tower of square cross-section having a plan according to FIG. 2.
Figure 7B:
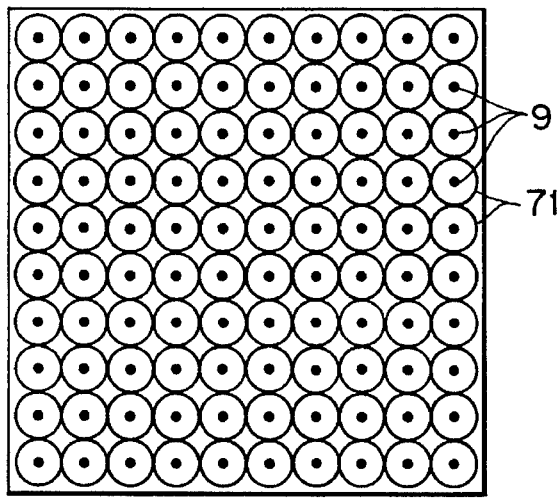

FIG. 7a and 7b show in a practical application the distribution of nozzles 9 over the cross-section in a tower having square cross-section. The square has a side of approximately 12.4 m and interiorly accommodates about 100 nozzles, in each plane, in a square lattice pattern with a pitch of about 1.2 m. The distribution is indicated by the circles 71 illustrating how the finely divided liquid 6 is injected at each lattice point. FIG. 7a thus shows the distribution of the nozzles 9 in the planes 81 and 83 in FIG. 2, and FIG. 7b shows the corresponding distribution of the nozzles in the planes 82 and 84. FIG. 7a and 7b show that a square cross-section need not entail any deviations from the theoretically desired regular lattice.

Figure 8:
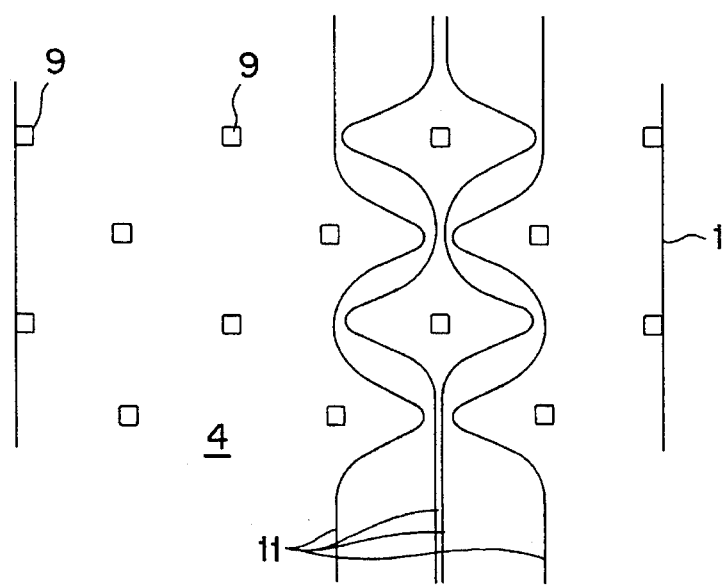
FIG. 8 schematically shows the gas flow through a washing tower according to the invention.

FIG. 8 schematically shows how the gas flows through the contact section 4. The flow lines 11 are meandering around the nozzles 9.

Figure 9A:
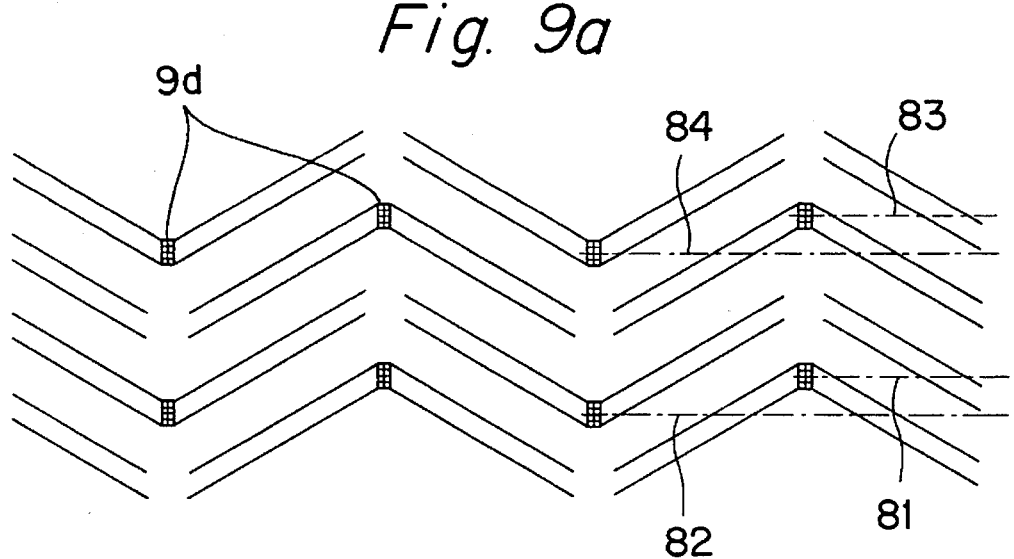
FIG. 9a shows the distribution of liquid droplets around linear spray nozzles in an alternative design; and, FIG. 9b shows a distribution of liquid droplets around hollow-cone type nozzles in an alternative design.
Figure 9B:
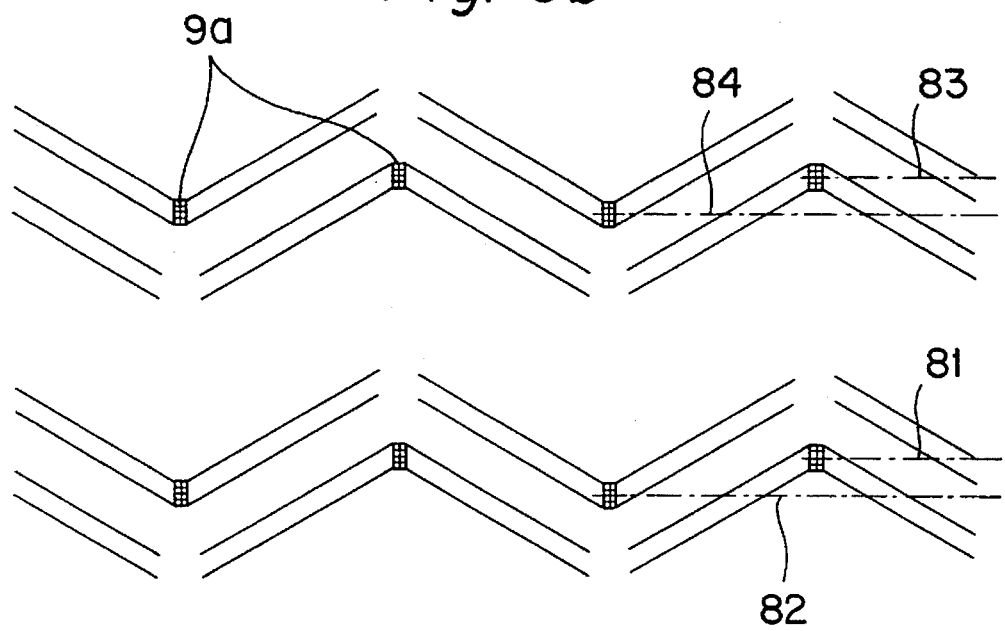

FIG. 9a and 9b show schematically the distribution of liquid droplets around some nozzles 9d, 9a having a spraying vertex angle of 120°. In FIG. 9a some linear spraying nozzles 9d is shown which are generating two linear curtains each with an intermediate angle of 120°. As can be seen the planes 81–84 may be pair-wise on the same level or even that the gas may first meet the liquid from the later plane. In FIG. 9b the same pattern is shown when applying hollow-cone type of nozzles 9a. In this design it is advantageous to accept a pair-wise difference in the distance between the liquid droplet flows to accomodate for the deviation from full symmetry.

The device in FIG. 2 operates as follows. Gas enters the tower 1 through the inlet 2 to the contact section 4. It ascends substantially vertically as indicated by arrow 41 until it comes to the vicinity of the first plane 81 with nozzles 9.

Through the nozzles 9, liquid 6 is injected substantially horizontally into the gas at a rate of 10–15 m/s. The gas is affected by the finely divided liquid and is entrained thereby in a direction which is approximately horizontal until it encounters other gas flowing in the opposite direction substantially midway between the nozzles 9 in the same plane 81.

Since the liquid droplets here have a substantially lower droplet flow density than close to the nozzle 9 (for they are naturally spread over a larger volume with increasing distance), the gas passes between the liquid droplets upwards towards the next plane 82 straight opposite a nozzle 9 in this second plane. The gas flow thus concentrated by the impulse of the washing liquid in the plane 81 is there spread by the impulse of the liquid droplets injected into the gas by this nozzle 9. The gas flows, also there, substantially horizontally until it encounters gas entrained by the liquid droplets from adjacent nozzles 9.

This procedure is then repeated at the passage to the plane 83 and so on. By the repeated deflection and the alternating acceleration and retardation, there is produced an intense and efficient interaction between gas and liquid.

Liquid which in the form of finely divided droplets is entrained by the gas is separated in the droplet separator 10.

Through the conduit 19, a portion of the liquid is drained for subsequent treatment, and fresh or regenerated liquid is supplied through the conduit 18, as required.

The method according to the invention is of course not restricted to the embodiment described above but may be modified in several different ways within the scope of the appended claims.

As mentioned above, nozzles of various designs can be used. Also, the nozzles can be arranged in many different ways. Regular lattices are preferred but deviations therefrom are readily conceivable. Triangular or rhombic lattices may give very good results. An advantageous alternative is to equip every other plane with nozzles arranged in a triangular lattice and every other with nozzles arranged in a hexagonal lattice.

Moreover, the method may of course be used other than for cleaning polluted gases or cooling of hot gases. It may advantageously be applied in most contexts where a gas is to be contacted with a finely divided liquid.

I claim:

1. A method for contacting a gas with a finely divided liquid for at least one of a separation of particles, adsorption of gaseous pollutants, and cooling of the gas, comprising the steps of:

injecting a finely divided liquid in the form of a plurality of umbrella-shaped shells or linear curtains, in a regular arrangement, into a gas flow, the finely divided liquid being distributed in at least two supply planes substantially perpendicular to a main flow direction of the gas wherein a substantial portion of the finely divided liquid is injected with a velocity component in a plane perpendicular to the main flow direction of the gas that is greater than a velocity component parallel to or contrary to the main flow direction of the gas, wherein the finely divided liquid provides an impulse action on the gas flow deflecting the gas flow from the main flow direction so that the gas is alternately concentrated and spread in directions perpendicular to the main flow direction of the gas, an orthogonal distance between adjacent supply planes in the main flow direction being set so that the gas flow is not allowed to equalize between adjacent supply planes, and wherein liquid is injected in positions in adjacent supply planes so that the injection of liquid in a plane located downstream in the main flow direction of the gas takes place where the gas flow has been concentrated by the impulse action of liquid supplied in a plane located immediately upstream in the main flow direction.

2. A method as claimed in claim 1, wherein the orthogonal distance between adjacent planes in which finely divided liquid is supplied is set so that no substantial interaction between droplets supplied in different planes takes place between droplets flowing in opposite directions.

3. A method as claimed in claim 2, wherein the orthogonal distance between adjacent planes in which finely divided liquid is supplied is set so that an overlap area between adjacent contrary flows of droplets supplied in different planes provides equal density in the adjacent contrary flows at points where a density of liquid in each respective contrary flow is between 0.01% and 10% of a maximum density.

4. A method as claimed in claim 3, wherein the orthogonal distance between adjacent planes in which finely divided liquid is supplied is set so that interaction between adjacent contrary flows of droplets supplied in different planes does not take place between a main portion of the respective contrary droplet flows in an area immediately between supply points for the adjacent contrary flows.

5. A method as claimed in claim 2, wherein the orthogonal distance between adjacent planes in which finely divided liquid is supplied is set so that interaction between adjacent contrary flows of droplets supplied in different planes does not take place between a main portion of the respective contrary droplet flows in an area immediately between supply points for the adjacent contrary flows.

6. A method as claimed in claim 2, wherein a main portion of the finely divided liquid is injected in a direction contained within an angle of 20° symmetrical about a plane perpendicular to the main flow direction of the gas.

7. A method as claimed in claim 2, wherein a main portion of the finely divided liquid is injected as an hollow-cone with a vertex angle of 90° to 180° and with an axis of symmetry essentially parallel to the main flow direction of the gas and by arranging the nozzles in adjacent planes for antiparallel injection.

8. A method as claimed in claim 1, wherein the orthogonal distance between adjacent planes in which finely divided liquid is supplied is set so that an overlap area between adjacent contrary flows of droplets supplied in different planes provides equal density in the adjacent contrary flows at points where a density of liquid in each respective contrary flow is between 0.01% and 10% of a maximum density.

9. A method as claimed in claim 8, wherein a main portion of the finely divided liquid is injected in a direction contained within an angle of 20° symmetrical about a plane perpendicular to the main flow direction of the gas.

10. A method as claimed in claim 8, wherein a main portion of the finely divided liquid is injected as an hollow-cone with a vertex angle of 90° to 180° and with an axis of symmetry essentially parallel to the main flow direction of the gas and by arranging the nozzles in adjacent planes for antiparallel injection.

11. A method as claimed in claim 1, wherein the orthogonal distance between adjacent planes in which finely divided liquid is supplied is set so that interaction between adjacent contrary flows of droplets supplied in different planes does not take place between a main portion of the respective contrary droplet flows in an area immediately between supply points for the adjacent contrary flows.

12. A method as claimed in claim 11, wherein a main portion of the finely divided liquid is injected in a direction contained within an angle of 20° symmetrical about a plane perpendicular to the main flow direction of the gas.

13. A method as claimed in claim 1, wherein a main portion of the finely divided liquid is injected in a direction contained within an angle of 20° symmetrical about a plane perpendicular to the main flow direction of the gas.

14. A method as claimed in claim 1, wherein a main portion of the finely divided liquid is injected as an hollow-cone with a vertex angle of 90° to 180° and with an axis of symmetry essentially parallel to the main flow direction of the gas and by arranging the nozzles in adjacent planes for antiparallel injection.

15. A method as claimed in claim 1, wherein the orthogonal distance between adjacent planes in which finely divided liquid is supplied is adjusted so that an overlap area between adjacent contrary flows of droplets supplied in different planes provides equal density in the adjacent contrary flows at points where a density of liquid in each respective contrary flow is between 0.1% and 10% of a maximum density.

16. A method as claimed in claim 1, wherein a main portion of the finely divided liquid is injected in a direction contained within an angle of 10° symmetrical about a plane perpendicular to the main flow direction of the gas.

17. A device for contacting a gas with a finely divided liquid for at least one of a separation of particles, adsorption of gaseous pollutants, and cooling of the gas, comprising;

an inlet for a gas flow, an outlet for treated gas, a contact section disposed between the inlet and the outlet through which the gas flows in a main flow direction and supply means disposed in the contact section for injecting finely divided liquid in the form of essentially umbrella-shaped shells or essentially linear curtains, the supply means being disposed in at least two planes substantially perpendicular to the main flow in an essentially regular lattice pattern, the supply means being adapted to supply a substantial portion of the finely divided liquid having a velocity component in a plane perpendicular to the main flow direction greater than a velocity component parallel to or contrary to the main flow direction and being positioned to inject finely divided liquid into the flow so that the gas is alternately concentrated and spread by an impulse action exerted by the liquid on the gas in directions perpendicular to the main flow direction of the gas, wherein an orthogonal distance between adjacent planes of supply means is sufficiently small so that no substantial equalisation of the gas flow takes place between planes, and wherein the supply means in adjacent planes are positioned so that supply means in a plane located downstream in the flow direction of the gas are located where the gas flow has been concentrated by the impulse action of liquid supplied in the plane located immediately upstream.

18. A device as claimed in claim 17, wherein the orthogonal distance between adjacent planes is substantially less than a distance between adjacent lattice points or adjacent lines in adjacent planes and that the orthogonal distance between adjacent planes with supply means is less than 1 m.

19. A device as claimed in claim 18, wherein the supply means comprises substantially circular-spraying nozzles arranged in a lattice of one of a substantially triangular, quadrangular, hexagonal and equilateral pattern and wherein lattice patterns in adjacent planes are relatively staggered so that lattice points in a plane located downstream, as seen in tile main flow direction of the gas, are located substantially straight opposite the centres of gravity of the polygons generated by lines between adjacent lattice points in a plane located immediately upstream.

20. A device as claimed in claim 18, wherein the supply means comprise substantially rectilinear nozzles, the lines are straight and substantially parallel, and uniformly distributed over a cross-section of a contact portion and that the lines in adjacent planes are offset so that they are positioned, in a plane located downstream as seen in the main flow direction of the gas, substantially straight opposite an imaginary centre line midway between adjacent lines in the plane located immediately upstream.

21. A device as claimed in claim 17, wherein the supply means comprise substantially circular-spraying nozzles arranged in a lattice of one of a substantially triangular, quadrangular, hexagonal and equilateral pattern and wherein lattice patterns in adjacent planes are relatively staggered so that lattice points in a plane located downstream, as seen in the main flow direction of the gas, are located substantially straight opposite the centres of gravity of the polygons generated by lines between adjacent lattice points in a plane located immediately upstream.

22. A device as claimed in claim 17, wherein the supply means comprise substantially rectilinear nozzles, the lines are straight and substantially parallel, and uniformly distributed over a cross-section of a contact portion and that the lines in adjacent planes are offset so that they are positioned, in a plane located downstream as seen in the main flow direction of the gas, substantially straight opposite an imaginary centre line midway between adjacent lines in the plane located immediately upstream.

23. A device as claimed in claim 17, wherein the orthogonal distance between adjacent planes is substantially less than a distance between adjacent lattice points or adjacent lines in adjacent planes and that the orthogonal distance between adjacent planes with supply means is less than 0.6 m.

* * * * *